March 29, 1955 J. W. GREEN 2,704,878
WEAVING STRIPS
Filed Nov. 14, 1950
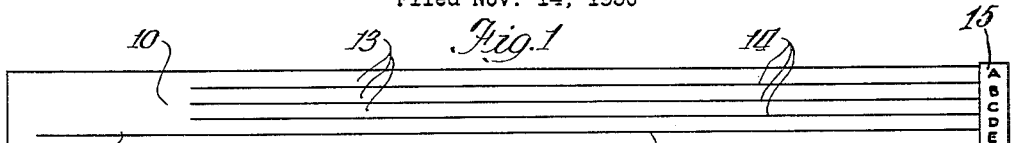
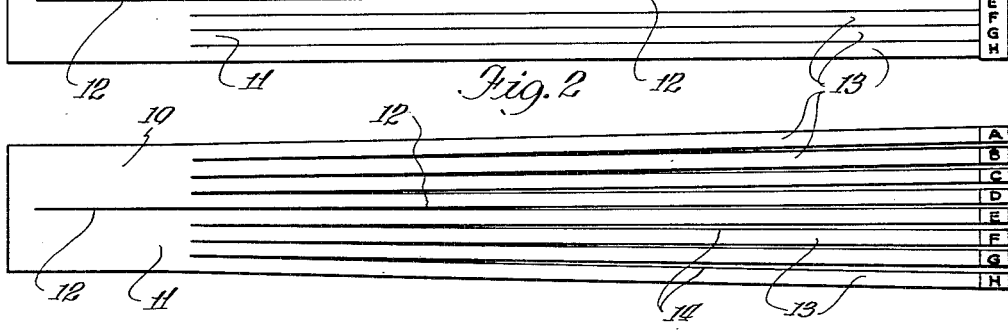
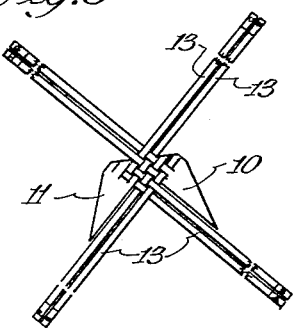
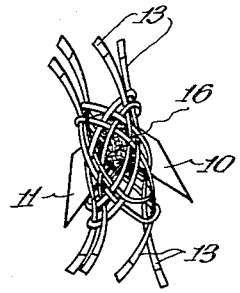
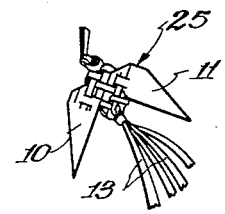
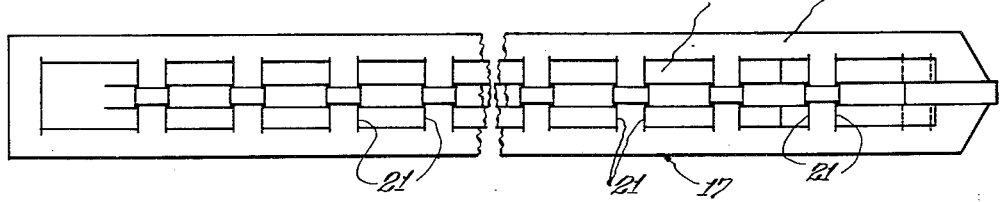
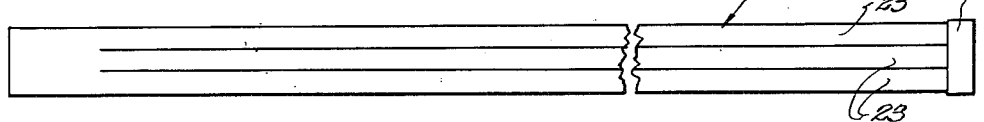
Inventor:
John W. Green
By: Watson D. Harbaugh
Attorney.

United States Patent Office 2,704,878
Patented Mar. 29, 1955

2,704,878

WEAVING STRIPS

John W. Green, Evanston, Ill.

Application November 14, 1950, Serial No. 195,696

2 Claims. (Cl. 28—78)

This invention relates generally to woven articles and more particularly to an improved strip of slit material adapted for the weaving of ornamental articles suitable for use as costume jewelry.

The development of thin sheets of flexible plastic materials having brilliant colors and highly polished surfaces has resulted in a new form of handicraft, namely, the weaving of strips of the plastic material into articles of costume jewelry such as lapel pins, earrings, belts, etc.

To weave such articles the plastic sheets are cut into strips which are in turn slit from one or both ends into individual thongs which are joined to each other at the unslit portion. The slit strips may then be woven with other strips or other materials to produce ornamental articles.

Because the plastic material is rather delicate and its appearance becomes marred by folding, wrinkling or excessive handling, the strips are frequently damaged before the finished article is woven, with the result that they must be scrapped.

One object of this invention is to provide an arrangement for handling the slit strips of the weaving material which will substantially decrease the likelihood of their being damaged before the article is completed.

Another object is to provide a retaining arrangement for the slit strips of material so that they may be readily packed and mailed in envelopes or packages as assembly kits suitable for sale to hobbyists.

A further object is to provide a finger tab on the end of each thong by which it may be handled during weaving to avoid unnecessary damage to the polished surface.

A further object is to provide a means for conveniently imprinting indicia on the thong ends as an aid in following weaving directions.

A further object is to provide a novel woven article of costume jewelry having an absorbent pad therein which serves to give the article body increasing its strength, and which may be used as a perfume sachet.

Other objects and advantages of the strips of this invention will, of course, present themselves to those familiar with the art on reading the following specification in conjunction with the drawing and the appended claims.

In the drawing:

Fig. 1 is a plan view of a pair of slit strips of weaving material, the loose ends being retained in accordance with this invention;

Fig. 2 is a plan view showing the two strips as they are cut prior to weaving;

Fig. 3 is a plan view showing the first step in weaving an ornamental bird from the strips of this invention;

Fig. 4 is a view showing an intermediate step;

Fig. 5 is a view of the finished bird;

Fig. 6 is a plan view of an ornamental belt woven with a strip of this invention; and Fig. 7 is a plan view of the strip of Fig. 6 prior to weaving it into the belt.

A fundamental concept of this invention is to provide one or more strips of material slit from one end to form a number of individual thongs which are joined at one end and free at the opposite end. The free ends of these thongs are held together in proper alignment by a strip of paper tape or similar material which is adhesively secured to the thong ends.

When it is desired to use the strips for weaving, the operator merely severs the paper tape between the thong ends to separate same, the paper on the thong ends constituting a friction surface which may be utilized during subsequent weaving of the strips. Moreover, identifying indicia may be inscribed on the paper tape, preferably before severing, which are helpful in the weaving operation especially when intricate articles are to be woven.

It will be appreciated that an improved weaving material can be formed by merely cutting the thong forming slits in such fashion that they extend from points spaced slightly inwardly from one end to points spaced a greater distance inwardly from the other end which eliminates the need for the paper tape and still results in aligned supported thongs. The use of the tape is preferred, however, because of the other advantages set forth above.

A pair of strips 10 and 11 is shown in Fig. 1. Although but two strips are shown, it is to be understood that any convenient number of strips joined at one end may be provided. The two strips 10 and 11 are substantially separated by a longitudinal cut or slit 12 which extends almost the full length of the strips. Each of the strips is divided into a plurality of parallel individual thongs 13 by somewhat shorter slits 14 which extend inwardly from one end to a line near the opposite end of the strips 10 and 11.

The free ends of the thongs 13 are aligned in parallel side by side relationship as cut, and are secured in this position by a folded paper tape 15 coated on one side with an adhesive material. It is preferred to employ a rubber base pressure sensitive adhesive on the tape 15 because such tape may be conveniently pulled off, but any suitable adhesive material may be used. It is also preferred to fold the paper tape 15 longitudinally down its center line so that it covers both sides of the strips 10 and 11 because better securement is thereby achieved. Moreover, once the thong ends have been separated by cutting the tape 15 between them there is less likelihood of the thong slipping out of the weaver's fingers if the tape 15 is applied to both sides. A separate tape 15 may be secured to each side, if desired, but a single folded piece serves to cover the sharp corners of the plastic and aids in lacing the thong during weaving.

Either before or after the tape 15 is applied, identifying indicia such as the letters illustrated in the drawing may be printed on the tape 15.

When in the form shown in Fig. 1 the assembled strips 10 and 11 may be very easily handled without likelihood of damaging the finish or of wrinkling or folding the material. The joined strips 10 and 11 may be readily packed in envelopes or in cartons for mailing, and are not likely to become damaged during mailing because the thongs cannot be shaken into misalignment or crossed. This makes the strips 10 and 11 of this invention particularly well adapted for assembly kits.

When the person receiving the kit desires to weave a bird or other article, he merely takes a scissors and cuts off the required number of strips 10 and 11 and cuts the tape 15 between adjacent thong ends to separate the thongs 13. The strips 10 and 11 then appear as shown in Fig. 2. It will be noted that the portion of the tape 15 on each thong 13 bears a single letter which serves to identify that thong during the ensuing weaving process.

To weave a bird 25 as shown in Fig. 5, the strips 10 and 11 are reversely bent on an angle at the end of the thonged portion and the thongs 13 are interwoven as shown in Fig. 3. The free ends are then carried over and back, being interwoven in the same criss-cross pattern as shown in Fig. 4. A small wad 16 of cotton or other absorbent compressible material is inserted between the interlaced thongs 13. Next the ends of the thongs 13 are pulled tight to form the body of the bird 25. In this operation the taped ends serve two purposes. First, the increased friction they present makes it possible to pull the thongs 13 more tightly to form a more solid body about the wad 16. Second, the indicia make it possible to pull and tighten the thongs in orderly sequence. Without the indicia it is almost impossible to tell which thongs are tight. After tightening the thongs 13 are knotted to form the head and tail, and the tape covered ends are cut off. The wad of cotton 16 serves as an absorbent pad for perfume and the like besides filling out the body for greater strength. The use of the bird 25 as a perfume sachet is particularly advantageous, for the wad 16 retains the perfume much longer than if it is merely daubed upon the skin. Moreover, the bird 25 may be removed from the clothing when it is not desired to be perfumed and reattached at some later time, meanwhile serving as a sachet for the drawer in which it is stored. The article can be used to good advantage by persons who are allergic to perfume applied to the skin and who still desire to wear a scent. If the bird 25 is to be a pin, a conventional safety pin (not shown) may be inserted through the thongs 13 on the bottom side prior to tightening, the detachable side of the pin facing outwardly so that the bird 25 may be pinned to the clothing. When a pin is used, the cotton wad 16 serves as a backing for the pin and prevents its being pushed into the body of the bird when the article is being pinned to the clothing. Many other designs such as lobsters or butterflies may be woven from the strips 10 and 11, but the bird 25 is representative.

From the description of the weaving procedure it will be appreciated that the plastic material must be handled quite a bit during weaving and that the greater friction of the tape covered ends greatly facilitates the handling of the thongs, particularly during the final tightening when the cotton wad 16 must be compressed. Thus the appearance of the finished article is enhanced by the use of the tape 15, because the wearing and soiling of the surfaces is confined largely to the taped ends which are cut off.

In Fig. 6 a belt 17 formed of a long narrow strip of felt 18 and a single strip of plastic 20 is shown. The felt strip 18 is cut so as to have a plurality of spaced transverse cuts 21 therein and the plastic strip 20 is woven through these cuts to form a checkerboard design. The strip 20 is formed exactly the same as the strips 10 and 11 shown in Fig. 1 and is provided with a piece of tape 22 which holds the ends of a plurality of thongs 23 in alignment.

In the case of the belt, the tape 22 serves to give additional stiffness to the thong ends and aids in lacing them through the felt strip 18. Since the plastic material is relatively thin and the tape 22 on the ends of the thongs 23 presents a rounded surface, the lacing is facilitated by the use of the tape 22 for the sharp corners which would otherwise catch the felt are covered by the tape. When the belt is completed, the taped ends serve as friction surfaces to hold the thong ends in place in the last of the cuts 21 through which they are threaded after rounding the end of the belt.

From the foregoing examples of the manner in which the strips of this invention may be used it will be appreciated that a superior strip for use in assembly kits and in production of costume jewelry articles has been provided. It will also be apparent that the arrangement of this invention could be applied to other materials such as leather, paper or fabric in addition to the plastic material described herein.

Other changes and modifications such as will present themselves to those familiar with the art may be made without departing from the spirit of this invention whose scope is commensurate with the following claims.

What is claimed is:

1. A strip of flexible weaving material comprising an elongated thin sheet having a plurality of longitudinal cuts therein extending inwardly from one end and forming a plurality of individual weaving thongs and an adhesive tape folded lengthwise and adhered to the ends of said thongs on both sides thereof, said tape having indicia thereon for designating the individual thongs once the tape between said thongs has been severed to permit separation of same.

2. In combination, a plurality of individual thongs of flexible material lying side by side in parallel relationship and a tape adhesively secured to the thongs near the ends thereof for holding same in alignment, said tape having indicia thereon for identifying the thongs after said tape has been severed between the individual thongs.

References Cited in the file of this patent

UNITED STATES PATENTS

| 1,273,815 | Bicknell | July 30, 1918 |
| 1,779,241 | Kohnle | Oct. 21, 1930 |
| 2,033,113 | Cohn | Mar. 10, 1936 |
| 2,311,959 | Nurk | Feb. 23, 1943 |
| 2,377,308 | Brown | June 5, 1945 |
| 2,508,669 | Glover | May 23, 1950 |

FOREIGN PATENTS

| 22,878 | Australia | Mar. 18, 1936 |

OTHER REFERENCES

"Handicraft," Lester Griswold, copyright 1942, pages 82–83.